United States Patent [19]
Vishlitzky et al.

[11] Patent Number: 5,987,566
[45] Date of Patent: *Nov. 16, 1999

[54] REDUNDANT STORAGE WITH MIRRORING BY LOGICAL VOLUME WITH DIVERSE READING PROCESS

[75] Inventors: Natan Vishlitzky, Brookline; Yuval Ofek, Framingham, both of Mass.; Eitan Bachmat, Lehavim, Israel

[73] Assignee: EMC Corporation, Hopkinton, Mass.

[*] Notice: This patent is subject to a terminal disclaimer.

[21] Appl. No.: 09/167,161

[22] Filed: Oct. 6, 1998

Related U.S. Application Data

[63] Continuation of application No. 08/653,154, May 24, 1996, Pat. No. 5,819,310.

[51] Int. Cl.⁶ .......................... G06F 12/02; G06F 12/16
[52] U.S. Cl. ........................ 711/114; 711/162; 714/6
[58] Field of Search .................. 711/114, 162; 395/182.04

[56] References Cited

U.S. PATENT DOCUMENTS

| | | | |
|---|---|---|---|
| 5,072,368 | 12/1991 | Foreman et al. | 714/6 |
| 5,088,081 | 2/1992 | Farr | 369/54 |
| 5,159,677 | 10/1992 | Rubsam et al. | 711/2 |
| 5,202,799 | 4/1993 | Hetzler et al. | 360/48 |
| 5,208,813 | 5/1993 | Stallmo | 714/7 |
| 5,212,784 | 5/1993 | Sparks | 714/6 |
| 5,239,659 | 8/1993 | Rudeseal et al. | 714/6 |
| 5,265,098 | 11/1993 | Mattson | 714/6 |
| 5,274,799 | 12/1993 | Brant et al. | 714/6 |
| 5,287,462 | 2/1994 | Jibbe et al. | 710/36 |
| 5,301,297 | 4/1994 | Menon et al. | 711/114 |
| 5,303,244 | 4/1994 | Watson | 714/5 |
| 5,337,414 | 8/1994 | Hashemi et al. | 710/52 |
| 5,345,565 | 9/1994 | Jibbe et al. | 710/130 |
| 5,363,500 | 11/1994 | Takeda | 711/161 |
| 5,390,187 | 2/1995 | Stallmo | 714/7 |
| 5,390,327 | 2/1995 | Lubbers et al. | 714/7 |
| 5,392,244 | 2/1995 | Jacobseon et al. | 711/114 |
| 5,394,539 | 2/1995 | Neuhard et al. | 711/209 |
| 5,396,596 | 3/1995 | Hashemi et al. | 711/113 |
| 5,404,454 | 4/1995 | Parks | 710/21 |
| 5,423,046 | 6/1995 | Nunnelley et al. | 713/330 |
| 5,432,922 | 7/1995 | Polyzois et al. | 714/6 |
| 5,435,004 | 7/1995 | Cox et al. | 707/205 |
| 5,440,716 | 8/1995 | Schultz et al. | 711/114 |
| 5,446,855 | 8/1995 | Dang et al. | 711/1 |
| 5,455,934 | 10/1995 | Holland et al. | 711/4 |
| 5,459,853 | 10/1995 | Best et al. | 711/114 |
| 5,463,765 | 10/1995 | Kakuta et al. | 714/6 |
| 5,469,566 | 11/1995 | Hohenstein et al. | 714/6 |
| 5,513,314 | 4/1996 | Kandasamy et al. | 714/6 |
| 5,649,152 | 7/1997 | Ohran et al. | 711/114 |

OTHER PUBLICATIONS

Dishon et al., "Disk Dual Copy Methods and Their Performance", Eighteenth International Symposium on Fault-Tolerant Computing, IEEE Comput. Soc. Press 1988, pp. 314–319, Jun. 1998.

*Primary Examiner*—Reginald G. Bragdon
*Attorney, Agent, or Firm*—George A. Herbster; Pearson & Pearson

[57] ABSTRACT

A mirrored memory for a data processing system. The memory system includes two device controllers and related disk drives for storing the mirrored data. Each of the disk drives is divided into logical volumes. Each device controller contains a plurality of reading processes and a correspondence table that establishes the reading process to be used in retrieving data from the corresponding disk drive. Each disk controller responds to a read command that identifies the logical volume by using the correspondence table to select the appropriate reading process and by transferring data from appropriate physical storage device containing the designated logical volume.

13 Claims, 7 Drawing Sheets

| LOGICAL VOLUME (70) | PHYSICAL VOLUME (71) | READ MODE (72) | READ ARGUEMENT (73) | |
|---|---|---|---|---|
| LVA | 31b | READ | | |
| LVB | 31b | DO NOT READ | | |
| LVC | 31b | DETERMINE | BOUNDARY | 52A |
| LVD | 31b | READ | | |
| LVE | 31b | DO NOT READ | | |
| LVA | 31y | DO NOT READ | | |
| LVB | 31y | READ | | |
| LVC | 31y | DETERMINE | BOUNDARY | 52B |
| LVD | 31y | DO NOT READ | | |
| LVE | 31y | READ | | |

FIG. 5

REDUNDANT STORAGE WITH MIRRORING BY LOGICAL VOLUME WITH DIVERSE READING PROCESS

CROSS REFERENCE TO RELATED APPLICATION

This application is a continuation of my co-pending application Ser. No. 08/653,154 filed May 24, 1996 for a METHOD AND APPARATUS FOR READING DATA FROM MIRRORED LOGICAL VOLUMES ON PHYSICAL DISK DRIVES, now U.S. Pat. No. 5,819,310.

BACKGROUND OF THE INVENTION

1. Field of the Invention

This invention generally relates to digital data storage systems and more specifically to digital data storage systems that provide redundant storage by mirroring data.

2. Description of Related Art

Many approaches have been developed for protecting critical data stored in a digital data system against loss resulting from power failures or transients, equipment malfunctions and other causes. In one approach normal operations on a data processing system stop so that all of or selected portions of the stored data can be transferred to tape or other backup media thereby to backup the memory system by providing a "snapshot" of the memory system at the time of the backup. Each successive backup may then either copy onto the backup media the data in the entire system or only the data or files that changed since a prior backup. This approach is still used in many data processing systems. However, even in personal computer systems, the time to complete such a backup may require an hour or more. It may also take a significant time to restore the information, particularly if a storage system, such as a disk drive, fails completely.

While such approaches may be acceptable for providing redundancy in home and small office systems, in recent years there has arisen another category of data processing system that requires essentially full-time availability and that incorporates large memory systems. Such data storage systems often include plural disk controllers, each of which controls multiple disk drives or other storage systems. Conventional backup procedures simply can not be used with such systems without significant interruptions that can lead to unacceptable intervals during which the data processing system is not available for its normal operations.

In some such prior art systems files are written to a specific disk drive, as a primary disk drive, through its corresponding disk controller. Additionally the writing controls are modified to write the file to another disk, as a secondary disk drive, connected to the same or another disk controller. This provides full redundancy. However, the data processing system must perform two writing operations sequentially. Sequential writing operations can affect the operation of the data processing system. Each copy is stored randomly on each disk and can even become fragmented. This can produce intolerably long retrieval times. Moreover, in such systems all normal reading operations involve the primary disk drive. No attempt is made to read from the secondary disk drive unless a problem occurs in the primary disk drive.

U.S. Pat. No. 5,390,313 issued to Yanai et al., and assigned to the assignee of this invention, discloses an approach for providing data redundancy. The system includes at least one pair of disk storage devices. Each device has a plurality of generally identical data records. These are "mirrored" disks or storage media. Each medium includes position indicators for providing one or more indications of rotational position of each of the rotating data storage media with respect to its associated fixed position read/write mechanism. A position monitor receives the rotational position indications from each rotating data storage medium and computes and monitors the rotational position of each rotating storage medium with respect to its associated read/write mechanism. After receiving a request for access to one or more data records stored on the mirrored pair of rotating data storage media, the system computes projected data access times for retrieving the requested data record on each of the rotating data storage media and commands retrieval of the requested data record to the rotating data storage medium having the shortest projected data access time based upon rotational position in state of the respective data storage medium. Consequently unlike the previously discussed file copy systems, data can be read from either of the mirrored memories.

U.S. Pat. No. 5,212,784 issued to Sparks discloses another type of automated backup system in which separate logical buses couple a primary controller to a set of paired mirrored memories or shadowed primary data storage devices. A backup device controller attaches to one of the logical buses and a backup device. The primary controller writes data to both the primary data storage devices to produce mirrored copies. In a backup mode, the backup device controller transfers data that it reads from a designated one of the primary data storage devices to the backup storage device. After the backup is complete, the primary controller re-synchronizes the primary data storage devices so that data that has been written on the continuously operational data storage device is copied onto the designated data storage device. In an alternative embodiment separate logical buses couple the primary controller to at least a set of triplet or quadruplet mirrored or shadowed primary data storage devices. Triplet devices permit backup operation while retaining the redundancy characteristic of the mirrored storage devices. Quadruplet devices permit continuous backup operations of two alternating storage devices retaining the redundancy characteristic of mirrored storage devices.

U.S. Pat. No. 5,423,046 issued to Nunnelley et al. discloses a high capacity data storage system with a large array of small disk files. Three storage managers control (1) the allocation of data to the array, (2) access to the data and (3) the power status of disk files within the disk array. More specifically, the allocation manager controls, inter alia, the type of protection desired to include redundancy by mirroring. The access manager interprets incoming read requests to determine the location of the stored data. That is, the access manager determines which cluster or clusters in the data memories contain the requested data set and then passes that cluster list to the power manager. The power manager determines which disk files must be activated to fulfill the request.

U.S. Pat. No. 5,392,244 issued to Jacobson et al. discloses memory systems with data storage redundancy utilizing both mirroring and parity redundancy. The memory system places more critical data in the mirrored areas and less frequently accessed data in the parity area. Consequently the system effectively tunes the storage resources of the memory system according to the application or user requirements. Alternatively the tuning can be made on the basis of accesses to the data such that the mirrored areas store recently accessed data while the parity raid area stores the remaining data.

U.S. Pat. No. 5,432,922 issued to Polyzois et al. discloses a storage system using a process of alternating deferred updating of mirrored storage disks. Data blocks or pages to be written are accumulated and sorted into an order for writing on the disk efficiently. The individual disks of a mirrored pair are operated out of phase with each other so that while one disk is in the read mode the other is in the write mode. Updated blocks are written out to the disk that is in the write mode in sorted order. Read performance is provided by directing all read operations to the other disk, that is in the read mode. When a batch of updates has been applied to one disk of a mirrored pair, the mirrored disks switch their modes and the other disk, that had been in the read mode is updated.

U.S. Pat. No. 5,435,004 issued to Cox et al. discloses yet another redundant storage variant. A computerized data backup system dynamically preserves a consistent state of primary data stored in a logical volume of a disk volume management system. A file system command invokes a cloning of the logical volume thereby reserving a portion for shadow-paged blocks. A read/write translation map establishes a correspondence between unshadowed and shadowed pages in a reserved portion. Upon generating a read command for a page in a logical volume, a map search detects that a shadowed page is allocated to the shadowed page blocks corresponding to the page and effects the read. Backup occurs while the system is operating thereby facilitating reading from the non-shadow page blocks during such a backup.

In still another system, that has been utilized by the assignee of this invention, each of two mirrored individual disk drives, as physical disk volumes, are divided into blocks of consecutive tracks in order. Typically the number of tracks in each block is fixed and is not dependent upon any boundary with respect to any file or data stored on the blocks. A typical block size might include four tracks. Assume for explanation that the blocks were numbered consecutively: (i.e. 0,1,2, . . . ), block 0 would comprise tracks 0 through 3; block 1, tracks 4 through 7; etc. During each reading operation, the data system reads all data from odd-numbered blocks (i.e., blocks 1,3 . . . ) from the first mirrored physical disk drive and all the even-numbered blocks (i.e., blocks 0,2,4 . . . ) from the second mirrored physical disk drive.

However, when a read operation in the foregoing system recovers a data block that resides on consecutive blocks of tracks, for example, track blocks 1 and 2, the reading operation from the first physical disk drive must stop at track 7. Then the second disk drive must move its head to the appropriate track, track 8 on this example, to retrieve the next block. This interval, or "seek time", and a corresponding "latency", that represents the time required for the beginning of a track to reach a read/write head, determines the total access time. Whereas continuing the reading operation with the first disk drive might introduce a one-track seek time and one-revolution latency, switching to the second drive could involve an increase to a full maximum seek time and up to a one-revolution latency. Such a total access time will interrupt the transfer and can significantly affect the overall rate at which data transfers from the physical disk drives in some applications.

Other mirrored disk systems have used a "nearest server" algorithm to select one of the mirrored drives. In such a system, each read command initiates a process that determines which of two mirrored drives will be available first to begin a reading operation. The process can use any or all of several parameters, such as current head position to determine relative seek times, or whether one of the mirrored storage systems is then involved in some operation. This process is repeated for each read command.

Collectively the foregoing prior art discloses various approaches for minimizing the risk of data loss in a data processing system, particularly through the use of mirrored memory devices. This prior art also discloses various approaches for enabling reading operations from both physical disk drives in a mirrored pair. However, in these systems the decision on which of the mirrored pair will be used during a reading operation rests generally on the physical attributes of the disk drive rather than the data content of the drive. For example, the assignee's prior art system divides the physical drive into arbitrary blocks of contiguous disk tracks and then interleaves the reading operations according to the location of the data on a particular track. Another of assignee's system selects a particular one of the mirrored physical disk pairs based upon the time it will take to initiate an actual transfer. Still others make a determination based upon whether one or the other of the mirrored disk pair is involved in a backup operation or in a writing operation such that a reading or backup operation with one physical disk in the mirrored pairs causes the reading operation to occur from the other physical disk drive.

While these approaches generally provide some improvement in overall operations, experience demonstrates that these approaches can actually slow the effective transfer rate of a particular block of data as defined in a file or in a like block in other environments that are now becoming more prevalent in commercial applications. Moreover, once a particular approach is adopted for a physical disk drive, it applies to all the data on that physical disk drive. Consequently if a particular approach were selected based upon anticipated conditions associated with a particular application and the applications subsequently were to change, it is likely that performance for the new conditions would suffer. Further, a physical disk drive storing different data sets or files could have different requirements. For example, reading operations for one application might retrieve data for a large block of successive locations whereas another application might read data from small or incremental blocks taken from random locations. In such a situation, selecting a particular reading process optimized for one might not be optimal for another. However, it was still the approach to select one process for the entire physical disk drive even though less than optimal performance might be realized.

SUMMARY

Therefore it is an object of this invention to provide a method and apparatus for facilitating reading operations from a mirrored pair of physical disk drives.

Another object of this invention is to provide a method and apparatus for operating mirrored physical disk drives minimize latency and seek times and generally have the effect of maintaining high data throughput during reading operations.

Still another object of this invention is to provide a method and apparatus for facilitating reading operations from a pair of mirrored physical disk drives that is transparent to a user or host.

Yet another object of this invention is to provide a method and apparatus for facilitating reading operations from a mirrored pair of physical disk drives that facilitate the implementation of diverse reading strategies.

Still yet another object of this invention is to provide a method and apparatus for facilitating reading operations from different data sets stored in a mirrored pair of physical disk drives that enables the transfer to be optimized differently for the different data.

Yet still another embodiment of this invention is to provide a method and apparatus for facilitating a reading operation from a mirrored pair of physical disk drives and that facilitate an appropriate response when a problem is detected on one of the pair.

Yet still another embodiment of this invention is to provide a method and apparatus for facilitating reading operations from a mirrored pair of physical disk drives that improves the data transfer rate over the rates that characterize prior art devices.

In accordance with one aspect of this invention, physical disk drives or storage devices store redundant copies of related data in a mirrored fashion in a logical volume. A memory controller responds to a read command including a logical volume designation. A correspondency assigns to each logical volume a reading process by which data can be transferred from the logical volume. A data transfer controller responds to a read command and the correspondency by enabling the transfer of the data in the logical volume from physical disk drive according to the assigned reading process.

In accordance with another aspect of this invention, a data processing system includes, as interconnected components, at least one host adapter, a system memory including a buffer memory and a command memory, first and second disk drives from which data is read, and first and second device controllers for controlling transfers with the first and second disk drives and interconnecting the first and second disk drives. The host adapter includes a system memory manager that effects the transfer of a read command to the command memory over the system bus. Each of the first and second disk drives store redundant copies of data in a mirrored fashion in a plurality of logical volumes comprising a number of contiguous tracks. Each device controller includes a memory manager for controlling transfers between the corresponding device controller and the system memory. A buffer in each device controller stores data being transferred with the disk drive and a control connects to the buffer for controlling transfers between the disk drive and buffer. A correspondence table comprises a read mode field for each logical volume connected to the device controller that defines one of a plurality of reading processes for transferring data from a physical disk drive. The control responds to the receipt of a read command identifying a logical volume by using the correspondence table to connect to the device controller for effecting a transfer from the connected one of the mirrored disk drives in accordance with the selected reading process.

BRIEF DESCRIPTION OF THE DRAWINGS

It is the intent of the appended claims to point out and claim distinctly and with particularity the subject matter of this invention. The various objects, advantages and novel features of this invention will be more fully apparent from a reading of the following detailed description in conjunction with the accompanying drawings in which like reference numerals refer to like parts, and in which:

FIG. 5 depicts corresponding tables useful in the implementation of this invention.

DESCRIPTION OF ILLUSTRATIVE EMBODIMENTS

Figure 1:
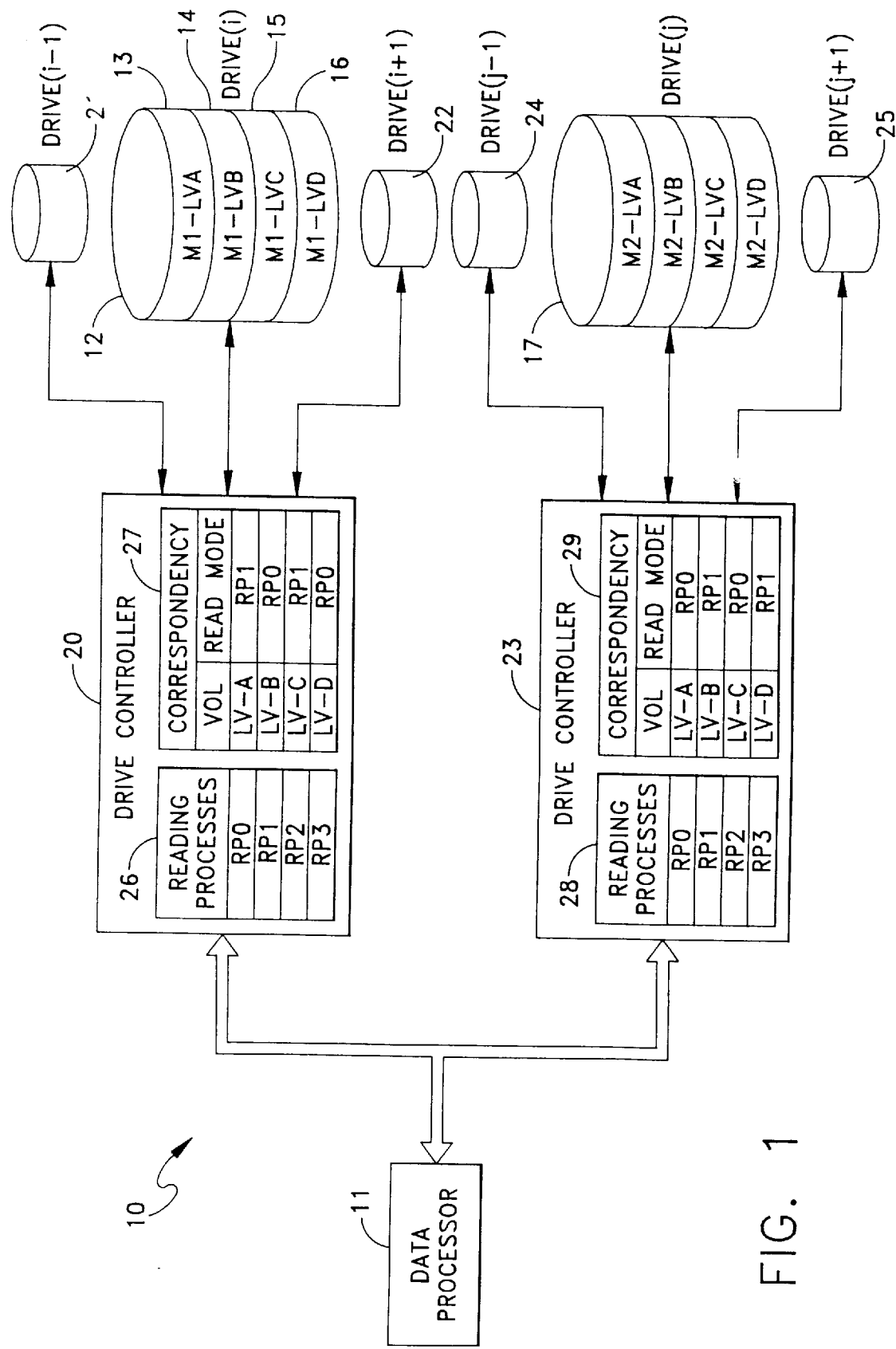
FIG. 1 is a block diagram of a basic data processing system that operates in accordance with this invention.

FIG. 1 depicts the major components of a data processing system 10 for enabling this invention to be discussed conceptually. This data processing system 10 includes a data processor 11 for processing data and programs stored in a memory system including a plurality of physical storage devices shown as DRIVE (i−1), DRIVE (i), DRIVE (i+1), DRIVE (j−1), DRIVE (j) and DRIVE (j+1), typically comprising different magnetic disk drives each having a plurality of tracks. In accordance with one aspect of this invention, DRIVE (i), designated by reference numeral 12, has a format that defines a number of logical volumes, each of which comprises a plurality of contiguous tracks. In this particular system, the physical drive is formatted into four logical volumes 13 through 16 and designated as LVA, LVB, LVC and LVD, respectively. For purposes of this explanation, it is assumed that DRIVE (i) will be one of two mirrored memories, designated M1 and M2, so the copies of the logical volumes on DRIVE (i) will be fully designated as M1-LVA, M1-LVB, M1-LVC and M1-LVD, respectively. If DRIVE (j), designated by reference numeral 17, is the other mirrored drive, it is divided into corresponding copies of the logical volumes, M2-LVA, M2-LVB, M2-LVC and M2-LVD. It will become apparent that the number of logical volumes is generally an arbitrary number under some maximum number and that each logical volume comprises an arbitrary number of contiguous tracks.

The system in FIG. 1 includes a storage memory or device of drive controller 20 for controlling the seek, read, write and other conventional operations involving the storage device 12 as well as storage devices 21 and 22, designated as DRIVE (i−1) and DRIVE (i+1) respectively. Similarly, another device or drive controller 23 controls the seek, read, write and other operations involving the storage device 12 as well as storage devices 24 and 25, designated DRIVE (j−1) and DRIVE (j+1), respectively.

As in any system incorporating conventional mirroring technology, each time the data processor 11 transfers data to a mirrored logical volume, such as logical volume LVA, it actually transfers data to logical volumes M1-LVA and M2-LVA in the mirrored physical storage devices 12 and 17, respectively. Thus, during normal operations, the data in the storage devices 12 and 17 typically have identical structures.

In accordance with this invention, each device or drive controller includes an area that stores different possible reading processes by which data can be transferred from a connected disk drive and a table or correspondency that assigns one of the reading processes to each logical volume on that physical storage device. For example, in the drive controller 20 an area 26 stores these reading process RP1, RP2 and RP3 while a correspondency 27 establishes a read mode for each logical volume in the physical storage device 12 and, as necessary, other connected devices 21 and 22 that act as mirrors. An area 28 and a correspondency 29 in drive controller 23 perform analogous functions with respect to the physical storage device 17 and, as necessary, the other connected devices 24 and 25. For example, assume the RP1 reading process transfers data while the RP0 reading process normally prevents the drive controller from responding to a read command unless the other physical storage device is not operating. If the device controller 20 is to perform a read operation, the READ MODE field has a value of "RP1" to select the RP1 read process; if the device controller 23 is to perform the read operation, the field in the correspondency 29 has a value of "RP1". Thus, as shown in FIG. 1, the correspondency 27 establishes a control whereby the device controller 20 will use the RP1 reading process to transfer data from logical volumes M1-LVA and M1-LVC while the device controller 23 effects an analogous transfer from logical volumes M2-LVB and M2-LVD as assigned in its correspondency 29. Each of the correspondencies 27 and 29 can be constituted by addressable registers that can be set or modified from the data processor 10 or, as described later, by other procedures. As will also be described later, the READ MODE field in each correspondency can define still other reading processes that will establish which of the device controllers 20 and 23 will control a read operation.

When the data processor 10 issues a command to read data from one logical volume, e.g., volume LVA, both the device controllers 20 and 23 respond initially, but differently. That is, both begin processing the command. However, as part of that process, each device controller compares the requested logical volume and the data in the READ MODE field in its correspondency to select a corresponding reading process. If the device controller is designated to read that logical volume, it performs the operation. If it is not, the device controller terminates further operations in an orderly fashion and becomes available immediately for processing some other command. For example, if a read command specifies logical volume LVA in the particular system of FIG. 1, only the device controller 20 responds and initiates the read operation from the volume M1-LVA on physical storage device 12.

This location of redundant data in a logical volume replicated in two or more mirrored physical storage devices and the ability to assign different reading processes or strategies to each logical volume, even when a physical storage device contains multiple logical volumes, can increase throughput in a number of typical applications. For example, assume that reading operations from two different logical volumes will occur essentially simultaneously. Improved results can be obtained under a strategy of having all transfers from one of the logical volumes made from a first physical storage device and all transfers from the other logical volume made from the second physical storage device. In the example in FIG. 5, logical volumes LVA and LVB and logical volumes LVD and LVE have been set to operate according to such a strategy. If it is anticipated data will be read from random locations in a logical volume, it may be beneficial to separate the logical volume into two halves and assign all reading operations from a first half to one physical storage device or disk drive and from the second half to the other, or mirroring, physical disk drive. If it is anticipated that reading operations form a logical drive may be from random locations, it might be more beneficial to divide the logical volume into small blocks of tracks (e.g., 4 tracks, 8 tracks, etc.) and to assign alternate blocks to be read from alternate physical disk drives. Each of these and other possibilities, including blocking any transfer from a physical disk drive and variants on other reading processes, such as the "nearest server" process described earlier, constitutes a different reading process. In the foregoing examples, these different processes might be designated RP0 through RP4 with the following meanings:

| Reading Process | Definition |
| --- | --- |
| RP0 | This physical disk drive should not transfer data. |
| RP1 | Read all data in the logical volume from this physical disk drive. |
| RP2 (Arg) | Read all data in the first or second half of the logical disk drive as established by the argument. |
| RP3 (Arg) | Read all data from "odd" or "even" multi-track sections according to the argument. |
| RP4 (Arg) | Select the physical disk drive based upon information contained in the argument. |

In whatever form, however, the basic implementation of this invention enables a system administrator to customize a reading process to an application on a logical volume and to provide different reading processes on mirrored physical disk drives for different applications on a logical-volume-by-logical-volume basis. As a consequence, the administrator can organize the system for maximum throughput on a logical-volume-by-logical-volume basis and avoid the prior art compromises.

With this background, it will now be helpful to discuss this invention in the context of a Symmetrix data facility manufactured and sold by the assignee of this invention. In this data facility device controllers analogous to drive controllers 20 and 23 perform all the processing necessary to implement mirroring and reading operations, so the entire implementation is transparent to the data processor 10.

Figure 2:
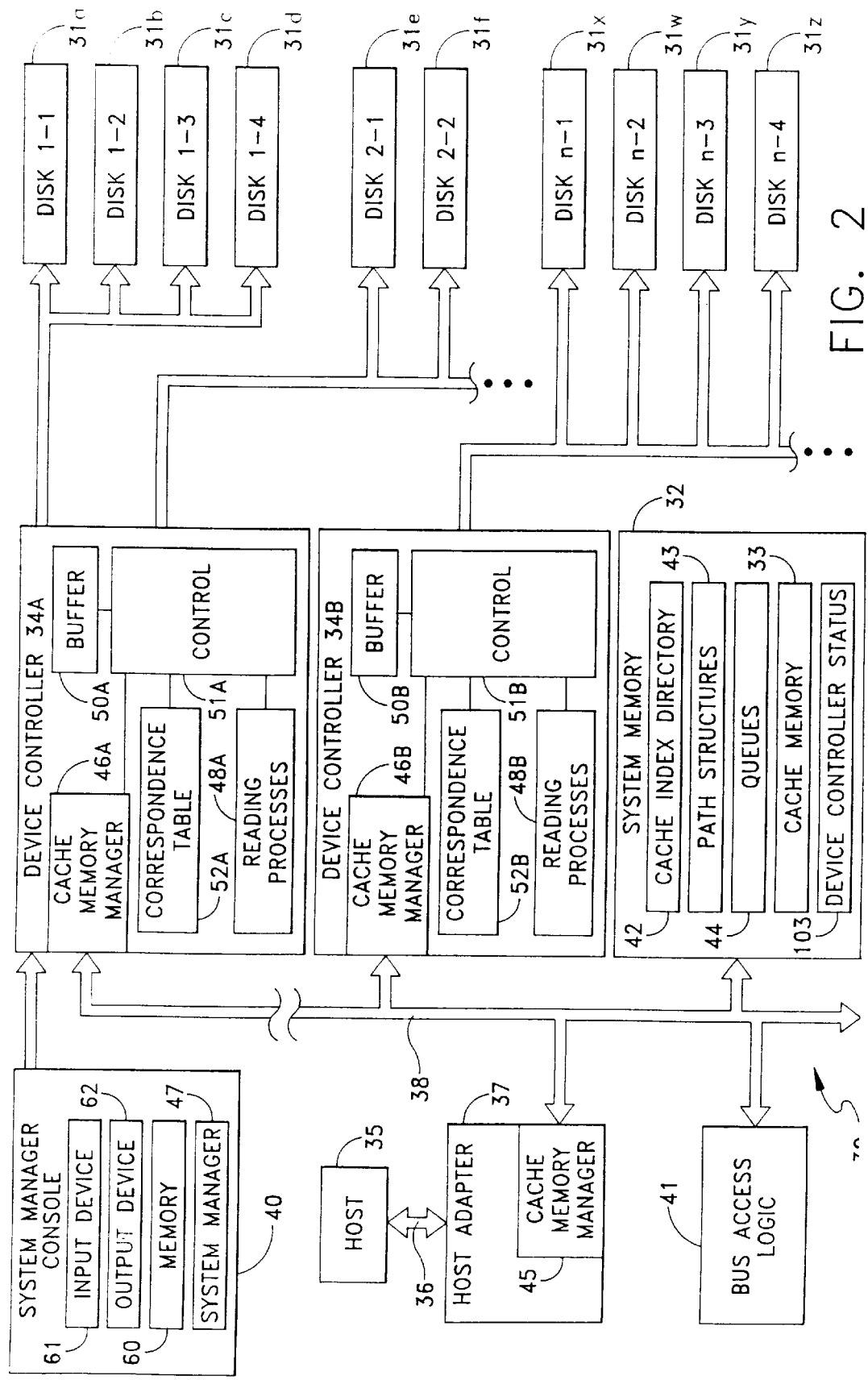
FIG. 2 is a block diagram of a specific data processing system that implements this invention.

Referring to FIG. 2, a data processing system 30 includes such a data memory system with a number of data storage devices 31a, 31b . . . 31y, 31z and a system memory 32 with a cache memory 33. In this particular embodiment the system 30 includes, by way of example, two identical device controllers 34A and 34B. The system may include additional device controllers and may also include redundant device controllers. Each device controller has the same basic structure so corresponding elements will have the same basic reference number with an "A" or "B" suffix to distinguish between the device controllers 34A and 34B respectively.

The device controller 34A controls data transfers with the data storage devices, generally comprising physical disk drives or "disks", including disks 31a through 31f; the device controller 34B, including disks 31x through 31z. The specific number of disks connected to any one device controller or set of redundant device controllers will depend upon a particular application. Moreover, although FIG. 1 and the following discussion use "disk" and "physical disk drive", each "disk" or "physical disk drive" may comprise a conventional disk drive or an equivalent storage device including, but not limited to, optical disks, CD-ROMS and magnetic tape devices.

In FIG. 2 a single processor or host 35, an interconnecting data access channel 36 and a host adapter 37 connect to the system memory 32 over a system bus 38. A typical data processing system 30 may comprise multiple host adapters that connect to the system bus 38 in parallel. One or more hosts may also connect to each host adapter.

The system bus 38 is preferably the backplane of a printed-circuit card-cage or main-frame in cabinet. Each host adapter, such as host adapter 37, and each of the device controllers, such as a device controller 34A or 34B, will be constructed on a printed circuit board that is mounted in the card-cage or main-frame in the cabinet. The system bus 38 may comprise a pair of buses where a first bus connects to a first set of host adapters and a first set of device controllers and a second bus connects to a second set of host adapters and a second set of device controllers. In such systems both buses connect to the system memory 32. In the following discussion reference to the system bus 38 is intended to cover a channel including the single or multiple bus structures.

The data processing system 10 further includes a system manager console 40 including an additional processor on an additional printed circuit board that also connects to the system bus 38 typically through one or more of the device controllers, such as deice controller 34A by means of a serial or other communications link to the device controller 34A. The system manager console 40 permits a system operator to run setup and diagnostic programs for configuring, controlling and monitoring the performance of the data processing system 30. Essentially the system manager console 40 enables the operator to establish communications with the host adapter 37, the device controller 34B and the system memory 32.

Before any component, such as the host adapter 37 or the device controllers 34A and 34B can access the system memory 32, that component must obtain access to the system bus 38. Conventional bus access logic 41 receives access request signals from these components and grants access to only one such component at any given time. A wide variety of known arbitration schemes are suitable for use in a data storage system employing multiple processors and a shared system memory, such as the system memory 32.

Preferably the system memory 32 in FIG. 2 is a high-speed random-access semiconductor memory that includes, as additional components, a cache index directory 42 that provides an indication including the addresses of the data which is stored in the cache memory 33. In a preferred embodiment, the cache index directory 42 is organized as a hierarchy of tables for logical devices, cylinders, and tracks. The system memory 32 also includes areas for data structures 43 and queues 44. The basic operation of the system memory 32 is described in Yanai et al., U.S. Pat. No. 5,206,939 issued Apr. 27, 1993.

Typically, the system memory 32 is constructed on a number of additional printed circuit boards that are mounted in the card-cage or main-frame and coupled to the system bus 38. While multiple memory boards can support concurrent operations, only one memory board can be accessed at one time by a host adapter or device controller. System memory 32, particularly the cache memory 33, may also include a region of memory known as permacache memory. As is well known, data elements remain in permacache memory unless they are specifically deleted.

The coordination of each of the host adapters with each of the device controllers is simplified by using the system memory 32, and in particular the cache memory 33, as a buffer for data transfers between each host adapter and each device controller. Such a system, for example, is described in the above-identified U.S. Pat. No. 5,206,939. In such a system, it is not necessary to provide a processor dedicated to managing the cache memory 33. Instead, each of the host adapters or device controllers executes a respective cache manager program, such as one of the cache manager programs 45 in the host adapter 37 and cache manager programs 46A and 46B in the device controller 34A and device controller 34B, respectively. A system manager program 47 performs a similar function for the system manager console 40 and enables the operator to configure the system. Each of the cache manager programs accesses the cache index directory 42 and operates with data structures 43 and queues 44 for storing various commands. More specifically, the cache manager program 45 in the host adapter 37 writes data from the host 35 into the cache memory 32 and updates the cache index directory 42.

Each of the cache manager programs or modules 46A and 46B in the device controllers 34A and 34B stages data from the disks to the cache memory 33 through a buffer 50A or 50B respectively and updates the cache index directory 42. The cache manager programs 46A and 46B also de-stage or write back data from the cache memory 33 to the storage devices 11 and update the cache index directory 42. These operations involve interactions with a control program, such as reading process modules or processes 48A and 48B, control programs 51A and 51B, correspondence tables 52A and 52B as described more fully later.

Figure 3:
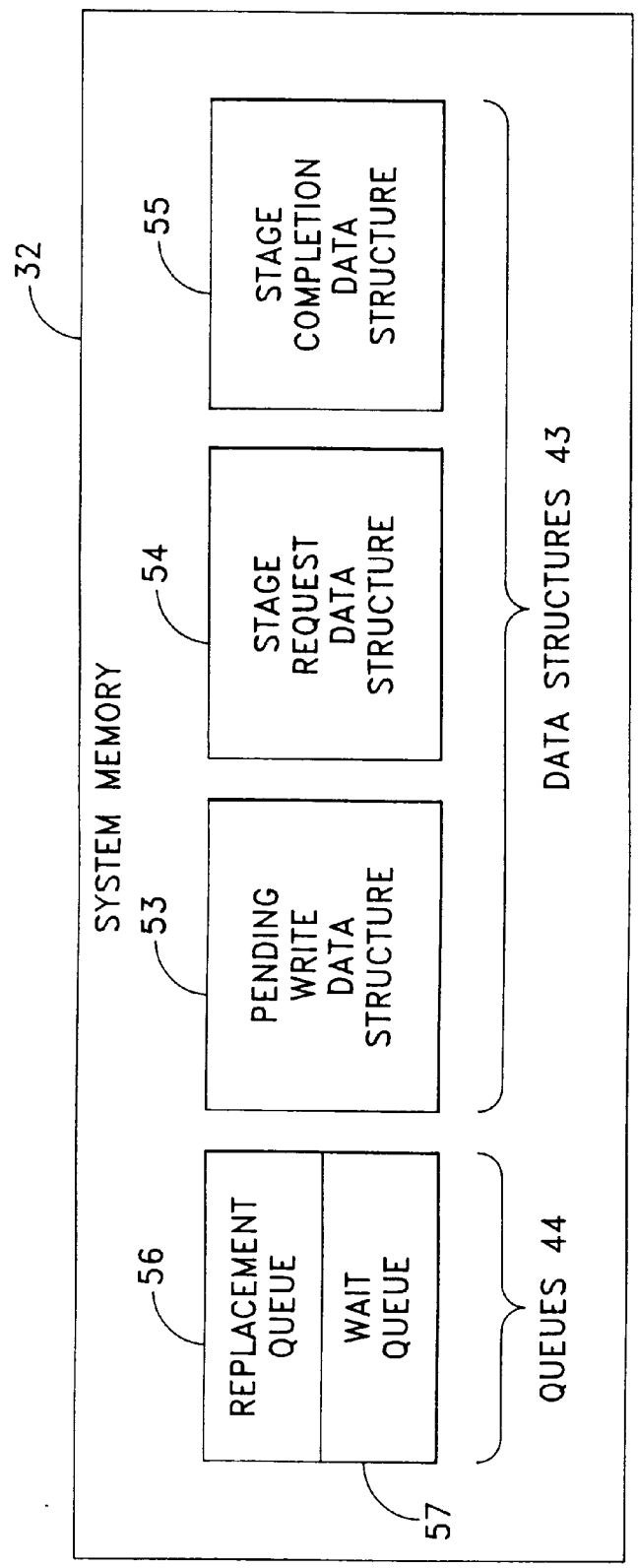
FIG. 3 depicts a system memory that is included in the data processing system of FIG. 2.

FIG. 3 depicts the data structures 43 and queues 44 of the system memory 32 in more detail. The data structures 43 include a pending write data structure 53, a stage request data structure 54 and a stage completion data structure 55. The pending write data structure 53 lists cache slots that have been written to but not yet written back to a storage device. Delays may occur during writing operations, so the write pending slots are organized as a tree structure. If a cache slot is in a pending write data structure 53, then it should not be in a replacement queue 56; otherwise, the modified data in the cache slot might be written-over and lost before it is written back to a storage device. The device controllers 34A and 34B can access the data structures 43 to perform the "de-stage" tasks of writing modified data from the cache memory 33 to the storage devices. For this reason, it is desirable to provide a separate pending write data structure 53 for each device controller, so that each device controller need access only the pending write data structure for the storage devices it services.

The queues 44 comprise the replacement queue 56 and a wait queue 57. The replacement queue 56 is analogous to the "least recently used" (LRU) queue used in prior art cache managers for readily identifying the least-recent-used data element in the cache. When the device controller is about to stage a data element into the cache memory 33 for a non-sequential process, a device controller inspects the head of the replacement queue 56 to select the slot of the cache memory 33 into which the data element is written, and this cache slot is then placed at the tail of the queue 56. The cache slot at the head of the queue 56 does not necessarily contain the least-recently-used cache data element, and therefore the queue 56 is referred to more generally as the "replacement queue" instead of the "LRU queue".

By way of further background, when the host adapter 37 responds to a data access command from the host 35 and finds that the requested data element is absent from the cache memory 33, the host adapter 37 inserts a stage request message into a stage request data structure 54. In the mirrored system all stage request messages are polled prior to initiating an operation. Once the appropriate data element is selected, the access operation is completed and a stage completion message is inserted into a stage completion data structure 55 as described more fully hereinafter.

As will become apparent, when a data processing system incorporates the reading procedure of this invention, the foregoing operations are still performed. For example, the device controller 34A or 34B responds to an attention or interrupt signal by removing the stage request message from the head of a corresponding stage request data structure 54 to determine the data element to be fetched. Once the data element has been fetched and written into the cache memory 33, the device controller places a stage completion message into the stage completion data structure 55 and sends an attention or interrupt signal to the host adapter 36. The stage completion message identifies the data element that has been staged. The host adapter 37 responds to an attention or interrupt signal by removing the stage completion message from the stage completion queue 55 and completing the data access operation by accessing the data element having been staged in the cache memory 33. As will also be apparent, there will be a separate stage completion data structure 55 for each host adapter.

Referring again to FIG. 2, this invention is adapted for use in a data processing system that provides data protection or redundancy by mirroring the data. With mirroring, a copy of the data resides at two different locations, preferably attached to different device controllers as shown in FIG. 1. In the specific embodiment of FIG. 2, disks 31*b* and 31*y* could be designated as two mirrored drives, for example. In accordance with this invention each disk drive in FIG. 2 can be partitioned into logical volumes generally as shown in FIG. 1. In the Symmetrix data facility, each drive can be organized between one and eight logical volumes, each of which can have any arbitrary size.

The system operator uses the system manager console 40 to configure each device controller and attached drive in data processing system. More specifically the system operator uses an initialization procedure, typically an interactive program, stored in a memory 60 of the system manager console 40 that additionally will include an input device 61, such as a keyboard, and an output device 62, such as a video display and/or printer. The operator uses the initialization procedure to transfer appropriate information to each of the cache manager programs 45, 52A and 52B. Such initialization procedures are generally known in the art.

Figure 4:
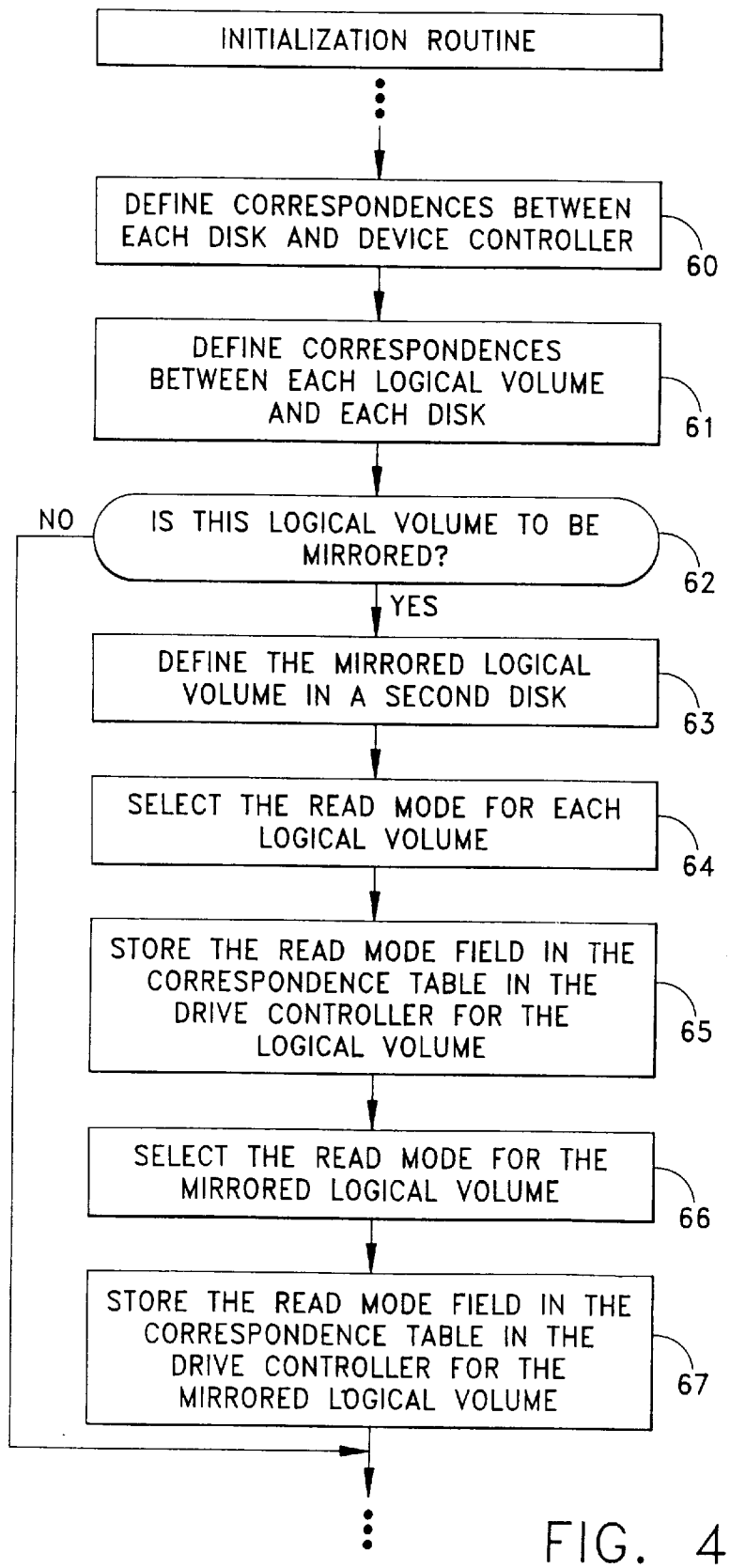
FIG. 4 is a flow diagram that depicts the basic procedure for initializing the data processing system shown in FIG. 2 to operate in accordance with this invention.

FIG. 4 depicts a portion of such an initialization procedure that establishes the initial conditions for enabling the implementation of this invention. At some point in the overall procedure the system operator defines the correspondence between each disk and device controller in step 60. That is, in the system of FIG. 2 the system operator defines the connections between device controller 34A and disks 31*a* through 31*f* and between the device controller 34B and disks 31*x* through 31*z* in FIG. 2. In step 61 of FIG. 4 the system operator initiates a definition of the correspondences between each logical volume and the reading process for retrieving data from each physical disk drive. Again using the foregoing example and assuming five logical volumes, the system operator would define the relationships that disk 31*b* constitutes disk M1 and FIG. 5 contains logical volumes M1-LVA, M1-LVB, M1-LVC, M1-LVD and M1-LVE. If each of these volumes is to be mirrored, step 62 diverts to step 63 whereupon the system operator defines the mirrored logical volumes in the second disk. In the example, the system operator would define disk 31*y* as containing the same logical volumes that are incorporated in disk 31*b*. Moreover, in step 63 the system operator defines each logical volume as being located on the same tracks in both drives.

In step 64 the system operator selects a read mode for each logical volume in the first drive, such as drive 31*b*. The system operator will enter these selections into the correspondence tables, such as the correspondence table 52A in the drive controller for the corresponding logical volume in the first disk as shown in FIG. 5. In steps 66 and 67 of FIG. 4 the operator uses a similar procedure to select complementary read modes for the mirrored logical volume and stores those values in the correspondence table such as correspondence table 52*b* in the device controller 46*b* to define the relationships in the disk 31*y*.

FIG. 5 depicts an embodiment of the correspondence tables 52A and 52B that includes, but is not limited to entries with a logical volume field 70, a physical volume field 71, a read mode field 72 and a read parameter or argument field 73. It will be apparent that the correspondence table might include other fields in a separate table or that these fields might be incorporated in other tables that already exist in the system.

This process thus establishes a relationship in each of the correspondence tables 52A and 52B, such as shown in FIGS. 2 and 5, among one of the reading processes in reading processes 48A or 48B, the logical storage volume and the physical disk drive. In FIG. 5 it is assumed that physical disk drive 31*b* in the example, includes logical volumes LVA through LVE as the mirrored volume M1 and that the disk drive 31*y*, as mirrored volume M2, contains the same logical volumes LVA through LVE. The initialization procedure in FIG. 4 will then have established the complementary READ MODE fields for each logical volume shown in table 52A and 52B as being selected from the "DO NOT READ", "READ", and "DETERMINE" values that correspond to the earlier RP0, RP1 and RP2 values of FIG. 1, respectively. The "DETERMINE" value includes an additional READ PARAMETER field or argument. Consequently the correspondence table 52A contains a number of entries including those specifically shown in FIG. 5 in which it has been determined that the device controller 34A will read the logical volumes LVA and LVD, that the device controller 34B will read the logical volumes LVB and LVE. If a read command identifies logical volume LVC, the "DETERMINE" or RP2 value requires some further processing before one of the device controllers 34A and 34B can be assigned to the operation.

Stated differently, in the specific arrangement shown in FIG. 5, only the device controller 34A will respond to any READ command identifying logical volume LVA or logical volume LVD by reading the data from disk 31*b* into the buffer 50A for subsequent transfer into the cache memory 33. Only the device controller 34B will respond to READ commands identifying the logical volume LVB or LVE by reading data from the disk 31*y* through the buffer 50B into the cache memory 33.

If a READ command identifies logical volume LVC, each of the device controllers 34A and 34B will make a determination of which of the two device controllers should effect the requested READ operation. There are several determining criteria. In one, for example, that is particularly adapted when an odd number of logical volumes are defined, the parameter located in the READ parameter 73 might constitute a track boundary within the logical volume with the consequence of assigning device controller 34A to read tracks of logical volume LVC with a track number that is less than or equal to the defined boundary track and of assigning device controller 34B to read data from the tracks having a number exceeding the boundary track number. This option is particularly useful when part of the physical disk drives comprises an odd number of substantially equally sized logical volumes so that each device controller will read from about 50% of the logical volumes.

In an alternative configuration, even with an odd number of logical volumes, each logical volume could be completely assigned to a "READ" or "DO NOT READ" mode without the need for any READ parameters. In some applications one drive controller could be assigned to read alternate logical volumes, such as assigning disk controllers 34A and 34B to read alternate logical volumes, such as having disk controller 34A read logical volumes LVA, LVC, LVE and disk controller 34B read logical volumes LVB and LVD. As still another alternative, the disk controller 34A could be set to read from logical volumes LVA, LVB and LVD and disk controller 34B set to read from logical volumes LVC and LVE. Still other types of reading operations could be assigned through the use of an appropriate READ parameter value.

In essence, when an operator completes the initialization procedure of FIG. 4, the system of FIG. 2 has a configuration in which redundancy is achieved by mirroring logical volumes and in which various correspondencies as shown in the corresponding tables 52A and 52B according to the reading processes 48A and 48B and the organization shown in FIG. 5 or some equivalent organization have been established.

After the initialization of the data processing system, operations including reading and writing operations can begin. In the Symmetrix system, each host adapter 37 identifies each logical volume and for that logical volume the device controller or controllers attached to that volume. When a write operation occurs to mirrored logical volumes, the host adapter 37 transfers pending WRITE commands to pending write data structures 53 in FIG. 3 associated with each of the corresponding controllers. That is, in terms of the mirrored drives, disk 31b and 31y in FIG. 2 the host adapter 37 loads a WRITE command into a stage request data structure 54 associated with the controller 34A and the controller 34B. Thereafter each of the device controllers 34A and 34B respond normally to this stage request data structure command and write the information from the cache memory 33 into the corresponding position in the disks 31b and 31y. Thus as a host makes changes to the data in any logical volume, the system responds automatically by a standard operation that writes that data to the corresponding tracks to the logical volume in both mirrored memories.

The response to the READ command remains the same if the data being read is located in the cache memory 33. That is, if the data is located in the cache memory 33 the data is retrieved from the cache memory 33 for transfer back to the host adapter 37.

Figure 6A:
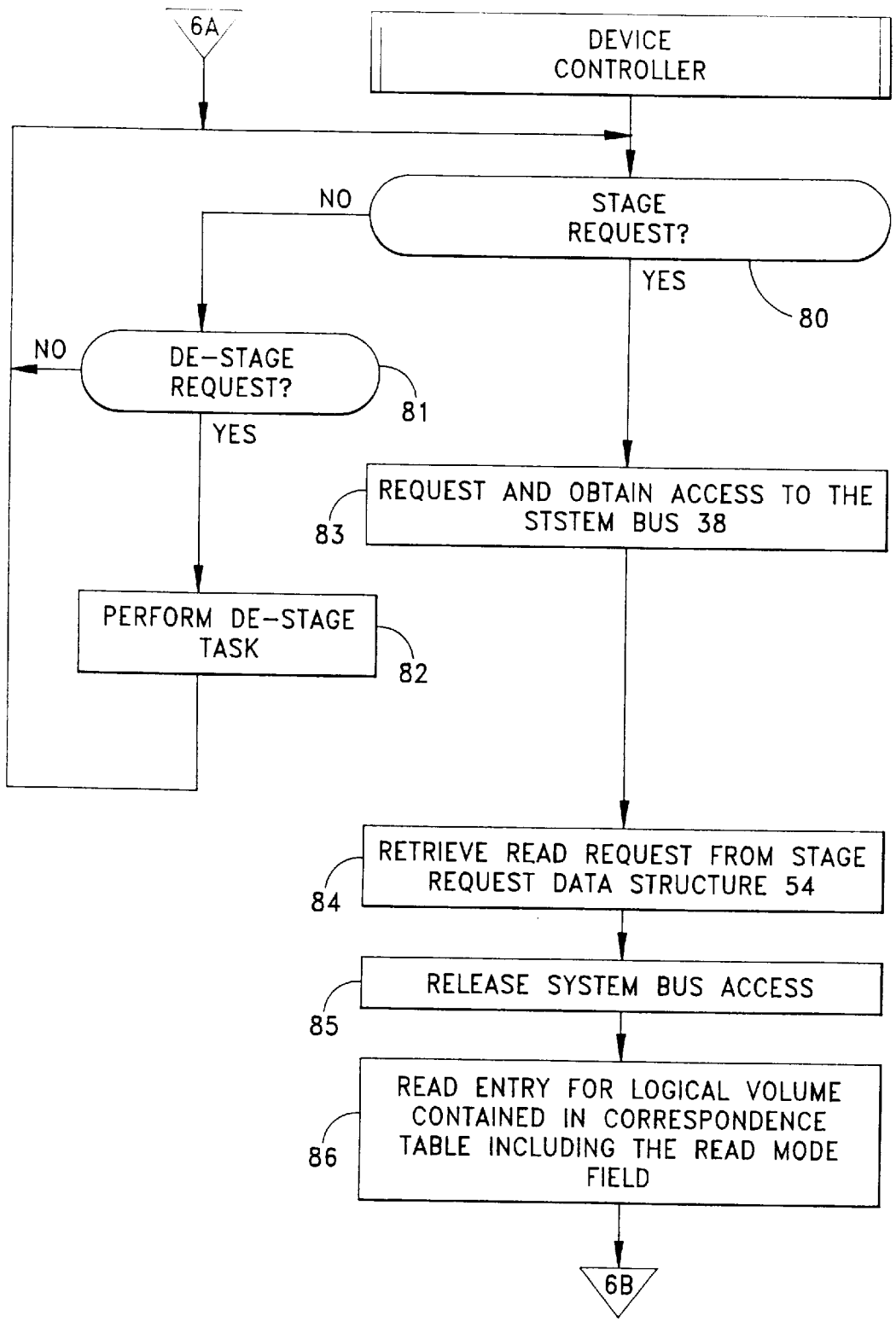
FIGS. 6A and 6B are flow diagrams that depict the basic operation of a device controller as shown in FIG. 2.
Figure 6B:
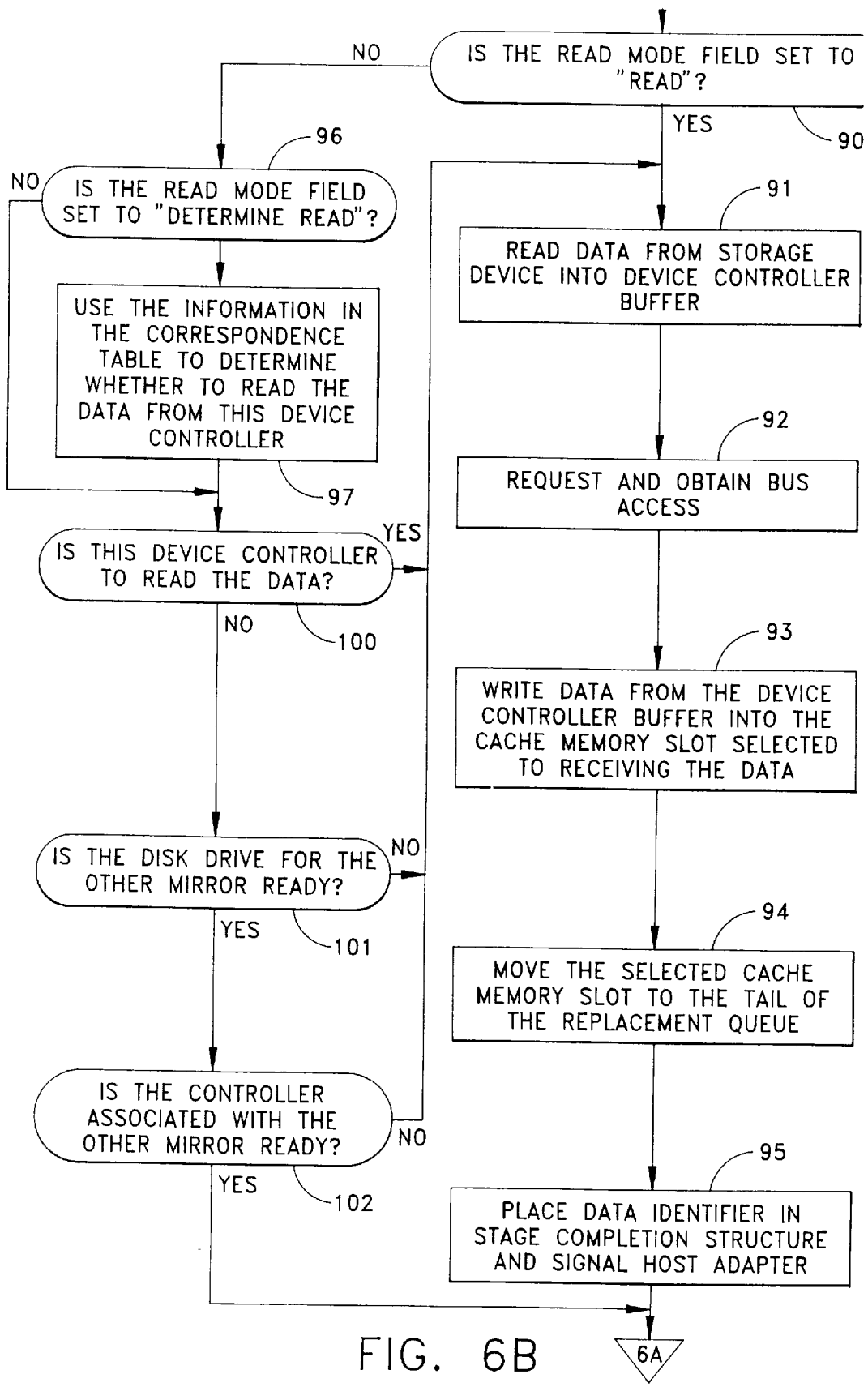

FIGS. 6A and 6B depict the operation of the cache manager programs 46A and 46B in the device controllers 34A and 34B respectively when the cache memory 33 does not contain the requested data. The process by which the system in FIG. 2 transfers data from the disks in a non-mirrored configuration is well known, so FIGS. 6A and 6B emphasize the modifications required to implement the reading operation for mirrored memories of this invention. Specifically, each of the device controllers 34A and 34B generally operate in a loop looking to determine, in step 80, whether a stage request is present in the stage request data structure 54 in FIG. 2 that identifies a particular device controller. If step 81 determines that a destage request is present, step 82 causes the system to implement that de-stage task. This loop, comprising steps 80 through 82 continues until such time as a read request from a host requests data that is not present in the cache memory 33. This places the request in the stage request data structure 54. When this occurs and the operation involves data in a mirrored memory, each device controller, such as each of device controllers 34A and 34B, (1) requests and obtains access to the system bus 38 in step 83, (2) retrieves the read request from the stage request data structure in step 84 and (3) relinquishes control of the system bus 38 in step 85. Typically limitations on bus access require that the two device controllers 34A and 34B perform these steps to retrieve a request in sequence. It is also possible that one of the data controllers 34A and 34B has been processing another request and must wait until that request has been completed before performing step 83.

Once a device controller completes step 85, it proceeds to step 86 wherein the entry for the logical volume contained in each correspondence table is retrieved. That is, the device controllers 34A and 34B respond to the request by retrieving the correspondence entries for the identified logical volume from the correspondence tables 52A and 52B shown in FIGS. 2 and 5. If the read request for the logical volume LVA, only the controller 34A is to read the data. The controller 34A then uses step 90 in FIG. 6B of its cache memory manager program 46A, shown in FIG. 2, to divert control to step 91 whereupon the control 51A will read the data from the disk 31b into the buffer 50A using the RP1 reading process of FIG. 2 or equivalent.

Once the buffer 50A has received the data in response to the request, the control 51A, through the cache manager program 36A, requests and obtains bus access in step 92 and writes the data in the device controller buffer 50A into the cache memory slot selected to receive the data within the cache memory 33 in step 93. In step 94, the cache manager program 46A moves the selected cache memory slot to the tail of the replacement queue 56 shown in FIG. 3. In step 95, the cache manager 46A places a data identifier in the stage completion structure 55 in FIG. 3 to indicate that the transfer is complete and initiates a process by which the host adapter 37 retrieves the requested data.

Using the foregoing example whereby the read request identifies logical volume A, the device controller 34B determines in step 87 that the read mode field 72 in the corresponding table 52B has the "DO NOT READ" value (i.e., the RP0 READ MODE value in FIG. 2). In a read sequence for logical volume A, the cache manager program 46B diverts control from step 96 past step 97 and transfers to step 100 with an indication the controller 34B is not to read any data. During normal operations the cache manager program 46B will use steps 100, 101 and 102 to transfer to step 80 in FIG. 6A.

Still referring to FIG. 6B, if an odd number of equally sized logical volumes exist so the RP2 reading process of FIG. 2 is desirable, both the cache manger programs 34A and 34B will divert from step 90 in FIG. 6B to step 96. Both will then process the information in their respective correspondence tables 52A and 52B in step 97 to determine whether the data is to be read through that particular device controller. One of the device controllers 34A and 34B will be designated to perform the READ operation and the corresponding one of the cache manager programs 46A and 46B will divert from step 100 to perform the reading operation in steps 91 through 95. The other one of the device controllers 34A and 34B will transfer from step 100 through steps 101 and 102 to return to step 80 in FIG. 6A. Similar steps can be used to incorporate other reading processes in the list of selectable processes.

As will now be apparent and in accordance with this invention, the data processing system shown in FIG. 2 can incorporate mirrored disks such as disk 31b and 31y that are divided into mirrored logical volumes. The device controllers 34A and 34B respond to a read command in accordance with one of plural reading processes 48A and 48B as designated by information in the correspondence tables 52A and 52B. These divisions into logical volumes and the generation of the correspondences are readily programmable during the initialization procedure of FIG. 4. Consequently the logical volumes can be controlled independently to optimize the reading process for an application in the logical volume. Moreover, if the reading pattern for a logical volume changes, as if the application changes, it is possible to modify or change the reading process used for that logical volume by operation of the system manager console 40.

Switching from a mirrored operation to a non-mirrored operation in case of a device controller or disk drive fault is easily accomplished and occurs during the processing of steps 101 and 102 in FIG. 6B by the other of the device controllers not involved in the reading operation. When a disk drive is operating properly, it generates a DRIVE READY signal. Likewise, so long as a device controller or redundant device controllers maintain an operating channel from the system bus 38 to the associated drives, there will be an appropriate CONTROLLER READY signal. Each of the paired device controllers includes a routine for monitoring the status of the other device controller and drive in the mirrored pair to determine if it is necessary to abort normal mirroring operations.

More specifically, assume that a read command has identified logical volume LVA so that the device controller 34A and disk drive 31b normally would respond and that the disk drive 31b is out of service, so that it no longer produces a DATA READY signal. When the cache memory manager 46B in the device controller 34B, as the other device controller, reaches step 101 in FIG. 6B, it will determine that the disk drive 31b is not ready. Consequently, step 101 will divert to read the data from the disk 31y by the procedure of steps 91 through 95. Similarly, if the device controller 34A were inoperative, the control 51B would determine that status, and the cache memory manager 46B would divert to step 51 to begin the reading operation from the disk 31y. Typically each device controller will update its status in a device controller status table 103 in the system memory 42. Consequently a device controller in a mirrored pair, such as device controller 34A can obtain the status of the other device controller 34B by accessing the device controller status table.

Once the defective disk drive or device controller were repaired or replaced, the corresponding device controller would update the corresponding information in the device controller status table. The other device controller, e.g., the device controller 34B of FIG. 2 in the above example, would return to normal operations by transferring operations from step 100 through steps 101 and 102 in FIG. 6B to step 80 in FIG. 6A.

As previously stated, the prior art concept of selecting a reading process on a physical storage device basis can involve compromises if that device stores different applications. These compromises can affect data throughput in situations where different applications on a physical storage device have diverse needs. With this invention, diverse applications can be stored in separate logical volumes and each physical storage device can store a number of such logical volumes. This invention provides the capability of selecting from among multiple reading processes using correspondences on a logical volume basis, rather than physical storage device basis, to enable the matching of a particular reading process to the needs and retrieval characteristics or patterns of the application in a logical volume. These needs generally include minimizing seek times as these times can have a marked affect on data throughput during a reading operation. Distributing the information, such as the different reading processes and correspondence tables, among the various disk controllers, enables the entire reading operation of this invention to be transparent to a user or host that requests the data transfer and enables the reading processes to be changed if needed. Moreover, the distribution facilitates the implementation of this invention even as part of memories added to an existing data processing system.

This invention has been disclosed in terms of certain embodiments. It will be apparent that many modifications can be made to the disclosed apparatus without departing from the invention. For example, this invention has been described in terms of a Symmetrix system using pairs. Therefore, it is the intent of the appended claims to cover all such variations and modifications as come within the true spirit and scope of this invention.

What is claimed as new and desired to be secured by Letters Patent of the United States is:

1. A mirrored memory system for retrieving data in response to a read command comprising:
   (A) at least a pair of mirroring physical storage devices for storing mirrored copies of related data organized as at least one logical volume, each read command designating a logical volume from which data is to be retrieved,
   (B) a reading process module with at least one reading process by which data can be transferred in response to a read command,
   (C) a correspondency that assigns to each logical volume the reading process by which data is to be read from said mirroring physical storage devices storing each logical volume, and
   (D) a data transfer control module operable in response to said correspondency and said reading process module and connected to said mirroring physical storage devices, said control module responding to a logical volume identification in a read command and the assignment from said correspondency by enabling the transfer of data from one of said mirroring physical storage devices containing the identified logical volume according to the assigned reading process.

2. A memory system as recited in claim 1 wherein the logical volume consists of a set of contiguous tracks on each of said mirroring physical storage devices, said reading process module establishes a reading operation for retrieving data in the logical volume from one of said mirroring physical storage devices and said correspondency assigns the reading process to only one of said mirroring physical storage devices whereby all data from the logical volume is retrieved from the one of said mirroring physical storage devices.

3. A memory system as recited in claim 1 wherein said reading process module establishes complementary reading operations for different portions of the logical volume and said correspondency assigns complementary reading processes to each mirroring physical storage device that stores the logical volume whereby data from a logical volume is retrieved from two of said mirroring physical storage devices.

4. A memory system as recited in claim 3 additionally comprising a table in said correspondency for each mirroring physical storage device that establishes a relationship between the logical volume and one of the complementary reading operations.

5. A memory system as recited in claim 1 wherein said data transfer control module includes a data transfer controller for each of said physical storage devices, said reading process module includes reading process identifications in each of said data transfer controllers and said correspondency includes in each of said data transfer controllers a correspondency table that defines for the logical volume the reading process assigned to the mirrored physical storage devices.

6. A memory system as recited in claim 5 additionally comprising a module that transfers entries to said correspondency tables.

7. A method for transferring in response to a read command, data from one of mirroring physical storage devices comprising the steps of:

(A) storing on the mirrored physical storage devices redundant copies of related data in a logical volume, each read command designating a logical volume from which data is to be retrieved, (B) defining at least one reading process by which data can be transferred in response to a read command, (C) assigning in a correspondency a reading process by which data in a logical volume is to be transferred from the mirroring physical storage devices storing the logical volume, and (D) determining, in response to the logical volume identified in a read command and the reading process identified by said correspondency assignment, the process by which the data will be transferred from the mirroring physical storage devices containing the logical volume.

8. A method as recited in claim 7 wherein the logical volume consists of a set of contiguous tracks on each mirroring physical storage device and one of the at least one reading processes establishes a reading operation for retrieving data for the logical volume from a designated one of the mirroring physical storage devices, said correspondency assignment step establishing which of the mirroring physical storage devices is to provide the data and said determination step enabling data transfers from the designated mirroring physical storage device in response to a read command identifying the logical volume.

9. A method as recited in claim 7 wherein said reading process definition step establishes complementary reading operations for different portions of the logical volume and said correspondency assignment step establishes complementary reading processes to each mirroring physical storage device that stores the logical volume whereby data from a logical volume is retrieved from at least two of the mirroring physical storage devices.

10. A method as recited in claim 9 additionally comprising a step of establishing in said correspondency assignment for each mirroring physical storage device a relationship between the logical volume contained therein and one of the complementary reading operations.

11. A method as recited in claim 7 wherein each of the mirroring physical storage devices connects to a device controller and wherein each device controller stores the reading processes and the correspondency assignments relevant thereto and performs said determining step to determine, in response to the selected reading process identified in the correspondency assignment, the operation of that device controller in response to a read command for data in the logical volume.

12. A method as recited in claim 11 additionally comprising a step of transferring entries to the correspondency assignments in each of the device controllers.

13. A method as recited in claim 12 additionally comprising a step of monitoring the performance of each device controller, one device controller performing a read operation when the operating status of the device controller assigned by the corresponding indicates its inability to perform.

* * * * *